(12) United States Patent
Ye et al.

(10) Patent No.: US 8,035,536 B2
(45) Date of Patent: Oct. 11, 2011

(54) DIGITALLY CONTROLLED THREE-PHASE PFC RECTIFIER

(75) Inventors: Zhen Z. Ye, Garland, TX (US); Milan M. Jovanovic, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 826 days.

(21) Appl. No.: 11/937,459

(22) Filed: Nov. 8, 2007

(65) Prior Publication Data

US 2009/0122582 A1   May 14, 2009

(51) Int. Cl.
*H03M 5/02* (2006.01)
(52) U.S. Cl. ............................ 341/56; 714/759; 323/283
(58) Field of Classification Search .................. 323/241, 323/283; 375/238; 714/752, 759, 799; 341/50, 341/51, 56
See application file for complete search history.

(56) References Cited

U.S. PATENT DOCUMENTS 5,798,623 A * 8/1998 El-Sadi .................... 318/400.17
7,388,522 B2 * 6/2008 Strong et al. .................... 341/56

* cited by examiner

*Primary Examiner* — Jessica Han
(74) *Attorney, Agent, or Firm* — Haynes and Boone, LLP

(57) ABSTRACT

A robust decoder generates an output state from input signals related to the line-voltage signals of a three-phase power system, using a segment identification method based on zero-crossings derived from line-voltage difference signals. The robust decoder includes a basic decoder that provides a current output state based on the input signals, a state table that provides a presumed previous state based on the current output state of the basic decoder, a binary feed back loop including a state element for storing a previous output state, and a selector for providing the output state based on the stored previous output state and the presumed previous state. The robust decoder may be implemented as hardware or software in a digital power converter. Such a digital power converter may include boost inductors each receiving an input line voltage signal from the three-phase power system to provide phase voltage signals, switches receiving the phase voltage signals to provide an intermediate voltage signal, the plurality of switches each being control by a driving signal, an output circuit coupled to the intermediate voltage signal to provide a rectified output voltage signal for digital power converter, and a digital control circuit receiving the input line voltages and the output voltage signal, the digital control circuit generating the driving signals to control the switches. The switches may be configured according to a state machine.

5 Claims, 12 Drawing Sheets

DIGITALLY CONTROLLED THREE-PHASE PFC RECTIFIER

BACKGROUND OF THE INVENTION

1. Field of Invention

This present invention relates to digital control of three-phase power converters. Specifically, the present invention relates to digital control of three-phase boost power-factor-corrected (PFC) rectifier.

2. Discussion of the Related Art

The six-step, three-phase boost PFC rectifier is widely used in high-power AC-to-DC conversions. Such a PFC rectifier achieves both low total harmonic distortion (THD) in its currents and unity power factor. The six-step operation is based on dividing a line cycle into six segments, with each segment being one of six switch states generated from either line or phase input voltages. In each segment, a specific pair of switches (i.e., two switches affiliated with two corresponding enabled phase voltages) are controlled by pulse width modulation (PWM) to implement single-switch, single-phase boost PFC rectification for each of the two phase voltages. At any given time, a switch state signal determines which pair of switches is modulated. The switch state signal is generated by a decoder which decodes binary signals derived from the input voltages. Thus, the three-phase boost PFC rectifier operates as two parallel single-phase boost PFC rectifiers. The currents in these two enabled phase voltages can be shaped according to the switch state signal, while the output voltage is maintained at a desired level. The current in the third phase voltage (i.e., the disabled phase voltage) is not directly controlled, but it is determined by the currents in the other two enabled phase voltages.

One problem associated with the six-step PFC rectifier relates to segment identification for both balanced and unbalanced input voltages. For balanced input voltages, two techniques for segment identification are used in the industry. One technique, which is described in U.S. Pat. No. 5,329,439, entitled "Zero-Voltage-Switched Three Phase Pulse Width Modulating Switching Rectifier with Power Factor Correction," to Dusan Borojevic, Fred C. Lee, and Vlatko Vlatkovic, detects zero-crossings of the three-phase voltages. In a balanced three-phase power system, the phase angle between any two phase voltages is 120°, and segment transitions occur at the phase voltage zero-crossing times. By decoding the zero-crossing signals of the input phase voltages, which are represented at logic high levels during the positive half-line cycle (i.e., 180°) and at logic low levels during the negative half-line cycle (i.e., 180°), six 60° segments may be obtained. However, this technique requires a neutral line, which may not be available in many practical applications. As a result, while this zero-crossing detection technique is applicable to a three-phase rectifier with a four-wire connection (e.g. a Wayne connection), it is not applicable to a three-phase rectifier with only a three-wire connection (e.g. a Delta connection).

Because most conventional three-phase rectifiers are used in three-wire systems (i.e., systems in which the neutral line is not available and in which phase-voltages are not accessible), a second segment identification technique detects line-voltage zero-crossing signals. Generally, the zero-crossing signals ($Z_{RS}$, $Z_{ST}$, and $Z_{TR}$) associated with the three unbalanced input-line voltages ($V_{RS}$, $V_{ST}$, and $V_{TR}$) cannot be directly used for segment identification. For balanced three-phase input voltages, however, phase-voltage zero-crossing signals can be indirectly derived from the known line-voltage zero-crossing signals by 30° phase shifting, using the fact that the phase shift between a line voltage and a corresponding phase voltage in a balanced system is 30° (e.g., the phase shift between line voltage $V_{ST}$ and phase voltage $V_S$ is 30°). This technique, however, leads to rather complex implementations, because detecting the line frequency and its variations require a phase-locked loop (PLL) circuit. Furthermore, this technique is generally not applicable to unbalanced input voltages, for which the phase angle between line and phase voltages is not necessarily 30°. Because a six-step, three-phase converter which properly identifies segments in both balanced and unbalanced input voltages is especially important to current-shaping and output voltage regulation, a simple and robust segment signal identification scheme is desired.

A decoder which properly identifies segments may be implemented in either hardware or software. A basic decoder, which is typically employed in a conventional six-step, three-phase converter, uses combinational logic to convert its binary input signals (e.g., zero-crossing signals of the input voltages) into one of the six output codes. However, because the output codes of this basic decoder are determined using only its contemporaneous input signals, the basic decoder essentially operates open-loop. Since the binary input signals are usually obtained by voltage comparators from input voltages that are susceptible to disturbance, the decoder may generate a false switching state as its output. A false switching state increases switching losses, component stresses and distortions of line current waveforms. The effect of disturbance on the binary input signals may be reduced when a hysteresis band is incorporated into the voltage comparators that sense zero-crossings of input voltages. However, it is difficult to design an optimal hysteresis band, because the amplitude of an unexpected input-voltage disturbance is almost impossible to estimate. Moreover, an excessive hysteresis band may cause an unacceptable phase delay, which causes the line currents to be significantly out of phase with the corresponding input voltages. Therefore, a robust segment-signal decoder in a six-step, three-phase converter with disturbance rejection is desired.

Yet another problem relates to current glitches during segment transitions. Such glitches result from one phase abruptly changing its switching state from "disabled" to "enabled" (i.e., from an uncontrollable phase current state to a controllable phase current state), while another phase changes its switching state from enabled to disabled. During these switching state changes, the corresponding duty cycles must change from one local steady state value to another local steady state value under current loop regulation. However, due to the current loop's limited bandwidth, the duty cycle changes may not be fast enough, thereby creating current transients that are seen as current glitches in the line current waveforms at the instants of segment transitions. To reduce these current glitches, the disabled phase current feedback path may be suspended by keeping the integrator output of the current-loop controller at the same value as before it is disabled. This technique is described in the article, entitled "A Three-Phase ZVT Boost Rectifier with Improved Analog Controller" by Richard Zhang, Silva Hiti, Fred C. Lee, and Dusan Boroyevic, and published in the IEEE Power Electronics Specialists' Conference (PESC) Record, pp 469-474, 1996. However, the implementation described in the article requires two extra analog electronic switches and a synchronization signal for each of the three current loops, adding extra complexity to an already complex analog controller circuit. Thus, a simpler and more robust solution than that described in the Zhang article is desired.

SUMMARY OF THE INVENTION

The present invention provides a simple and practical method for segment identification in a power converter handling both balanced and unbalanced input voltages. According to one embodiment, segment identification is achieved using three zero-crossing signals derived from line voltage difference signals. A method of the present invention is applicable to a wide range of input-voltage conditions (e.g., the present invention is applicable to both the balanced and unbalanced input voltages without a zero-sequence component), and may be implemented using either digital or analog techniques.

According to one embodiment of the present invention, the present invention uses segment transitions that coincide with zero crossings of line-voltage difference signals $V_{RS-TR}$, $V_{ST-RS}$, and $V_{TR-ST}$, where $V_{RS-TR}=V_{RS}-V_{TR}$, $V_{ST-RS}=V_{ST}-V_{RS}$, and $V_{TR-ST}=V_{TR}-V_{ST}$. All six segments within a line cycle may be identified based on zero-crossing of line voltage difference signals.

According to one embodiment of the present invention, a robust decoder reduces decoding errors resulting from input-voltage disturbance by incorporating a basic open-loop decoder, a binary feedback loop and a switch state table. At each potential segment transition, whether or not caused by a line-voltage disturbance or by a regular switch state change, an actual code of the switch state from the last sampling interval is compared with a code for the last sampling period generated from the basic decoder. The comparison determines whether or not a current transition in the input zero-crossing signals is a result of a disturbance. If the codes match, the input signal transition is regarded as to have not been caused by a disturbance, and the output code of the robust decoder is the same as the output code of the basic decoder. Otherwise, the input signal transition is considered to have been caused by a disturbance and thus ignored (i.e., the output state of the robust decoder remains unchanged). The correct code of the basic decoder for the last sampling interval is obtained by looking up a switch state table, based on the current line-voltage phase sequence. The line-voltage phase sequence is a quasi-positive-sequence, if the positive-sequence voltage is greater than the negative-sequence voltage for unbalanced input voltages. Conversely, the line-voltage phase sequence is a quasi-negative-sequence, if the positive-sequence voltage is less than the negative-sequence voltage for unbalanced input voltages. The performance of a robust decoder of the present invention may be further enhanced by real-time monitoring each segment's duration and comparing it with an estimated duration.

According to one embodiment of the present invention, current-glitches are reduced by storing the current controller state of the disabled phase voltage and restoring the current controller state when the phase voltage is next enabled. The current-glitches may be reduced in a digital implementation without extra components and with few changes in the control algorithm.

The present invention is better understood upon consideration of the detailed description below in conjunction with the accompanying drawings.

BRIEF DESCRIPTION OF THE DRAWINGS

FIG. 5 shows (a) waveforms of line voltages $V_{ST}$, $V_{TR}$, and $V_{RS}$ and zero-crossing signals $Z_{RS-TR}$, $Z_{ST-RS}$, and $Z_{TR-ST}$ derived from line-voltage difference signals $V_{RS-TR}$, $V_{ST-RS}$, and $V_{TR-ST}$; (b) desired and actual segments identified and their corresponding codes; and (c) enable or driving signals for each of switches 109-114 of the PFC rectifier 100 of FIG. 1.

DETAILED DESCRIPTION OF THE PREFERRED EMBODIMENTS

Figure 1:
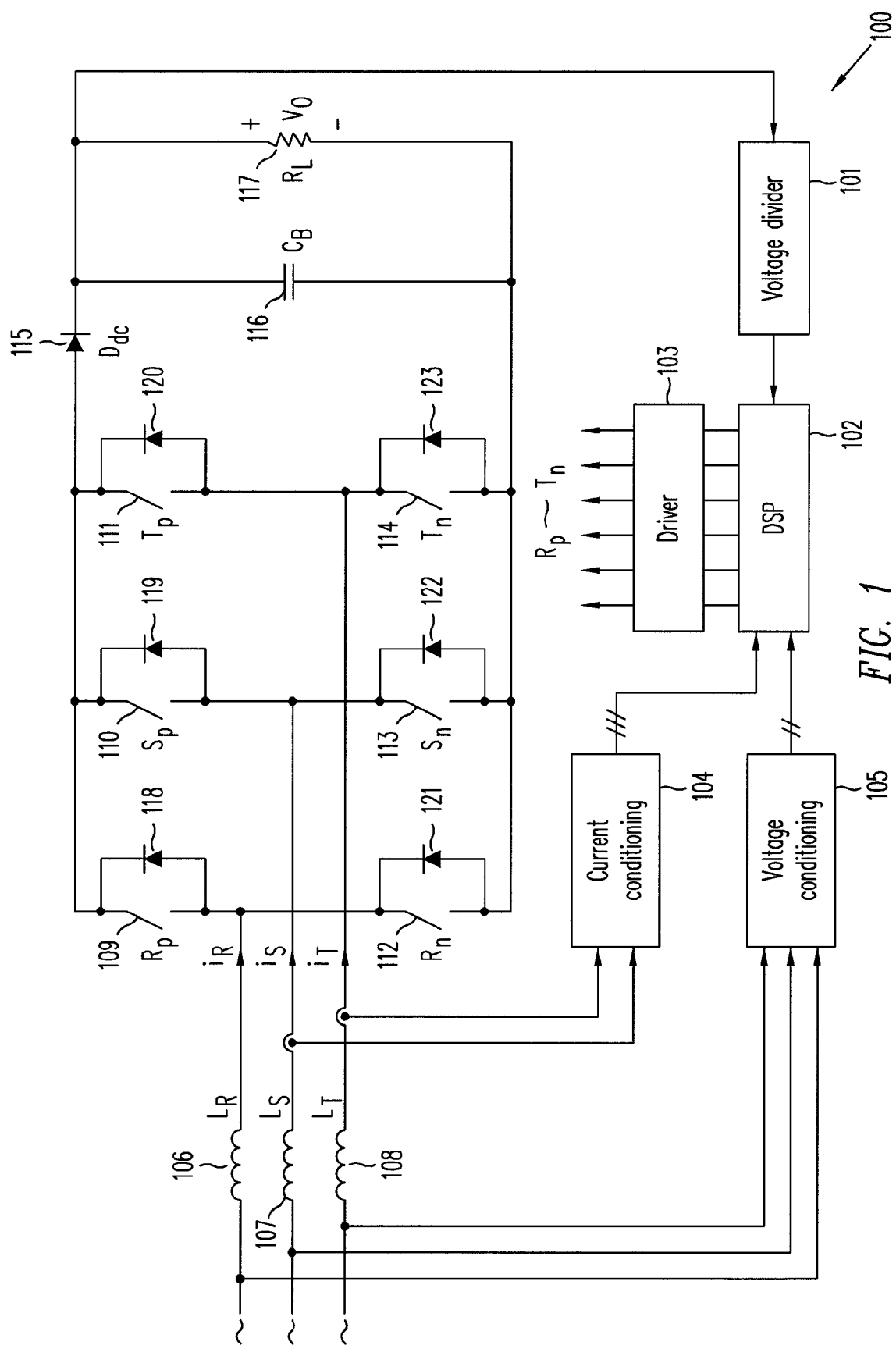
FIG. 1 is a circuit block diagram of digitally controlled three-phase boost PFC rectifier 100, in accordance with one embodiment of the present invention.

FIG. 1 is a circuit diagram of digitally controlled three-phase boost PFC rectifier 100 ("PFC rectifier 100"), in accordance with one embodiment of the present invention. As shown in FIG. 1, PFC rectifier 100 includes digital signal processor (DSP) 102 which receives as input signals (a) output voltage $V_0$ from voltage divider 101, (b) the input voltages of PFC rectifier 100 from voltage conditioning circuit 105, and (c) two of the three input currents from current conditioning circuit 104. DSP 102 provides control signals from driver 103 to control or drive switches 109-114 of PFC rectifier 100.

With balanced three-phase input voltages, PFC rectifier 100 divides the line cycle of the input voltages into six 60° segments. Within each segment, the input phase voltages do not change sign, and the phase voltage with the largest absolute value and a sign opposite those of the other two phase voltages is "disabled," while the other two phase voltages are "enabled." During each segment, the switches associated with a disabled phase are not modulated, so that the current associated with the disabled phase is determined by the currents in the enabled phase, which are controlled to follow their respective input voltage waveforms. In a balanced three-phase system, because the phase currents sum to zero, the current of the disabled phase voltage also follows its input voltage. However, in most industrial applications, the three-phase input voltages are not balanced. With unbalanced input voltages, the angle span (i.e., duration) of segments is generally not 60°, so that a segment identification approach applicable to a balanced three-phase system may not correctly identify the segments for an unbalanced three-phase system, thus adversely affecting the performance of the converter.

Figure 2:
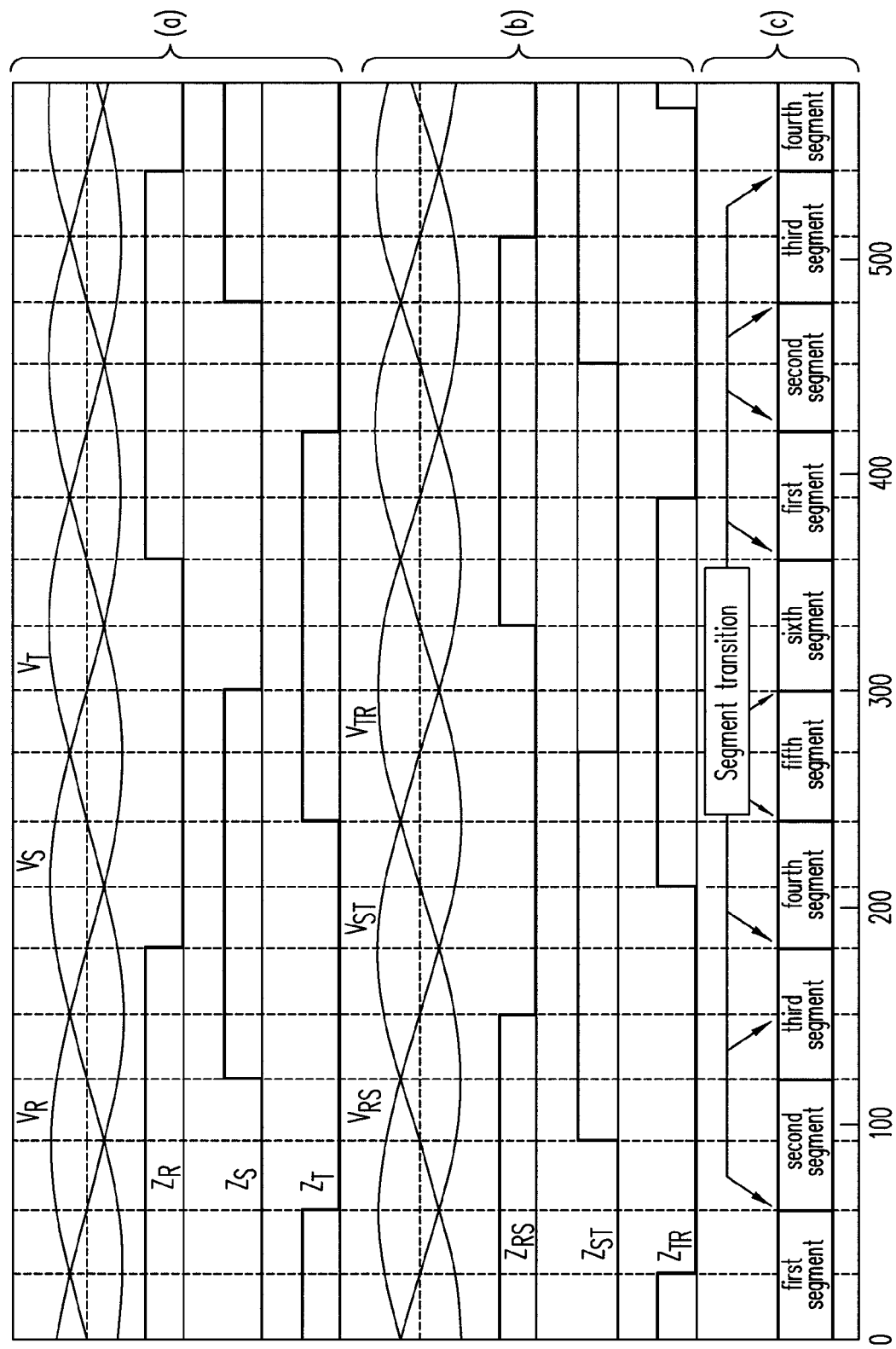
FIG. 2 illustrates a conventional segment identification scheme using (a) zero-crossing signals $Z_R$, $Z_S$, and $Z_T$ of the input phase voltages $V_R$, $V_S$, and $V_T$, and (b) zero-crossing signals $Z_{RS}$, $Z_{ST}$, and $Z_{TR}$ of input line voltages $V_{RS}$, $V_{ST}$, and $V_{TR}$, in a three-phase balanced power system; the segment transitions are shown in section (c).

FIG. 2 illustrates a conventional segment identification scheme based on zero-crossing signals $Z_R$, $Z_S$, and $Z_T$ of the input phase voltages $V_R$, $V_S$, and $V_T$, and zero-crossing signals $Z_{RS}$, $Z_{ST}$, and $Z_{TR}$ of input line voltages $V_{RS}$, $V_{ST}$, and $V_{TR}$, in a three-phase balanced power system. FIG. 2 shows (a) phase voltages $V_R$, $V_S$, and $V_T$, and their respective zero-crossing signals $Z_R$, $Z_S$, and $Z_T$; (b) line voltages $V_{RS}$, $V_{ST}$, $V_{TR}$, and their respective zero-crossing signals $Z_{RS}$, $Z_{ST}$, $Z_{TR}$; and (c) segment transitions. In FIG. 2, using zero-crossings of line voltages for segment identification, segments are obtained based on a 30° shift relative to the zero-crossings of the line voltages. This phase shift is expected between the phase and line voltages in a balanced three-phase power system. For an unbalanced, three-wire, three-phase power system, however, the actual phase voltages and their zero-crossing signals cannot be obtained, due to the absence of a neutral line. Also, in an unbalanced system, the zero-crossing signals of the input line voltages and the segment signals are not related in an apparent way. A different approach is desired to generate segment transition signals for both balanced and unbalanced input voltages.

Figure 3:
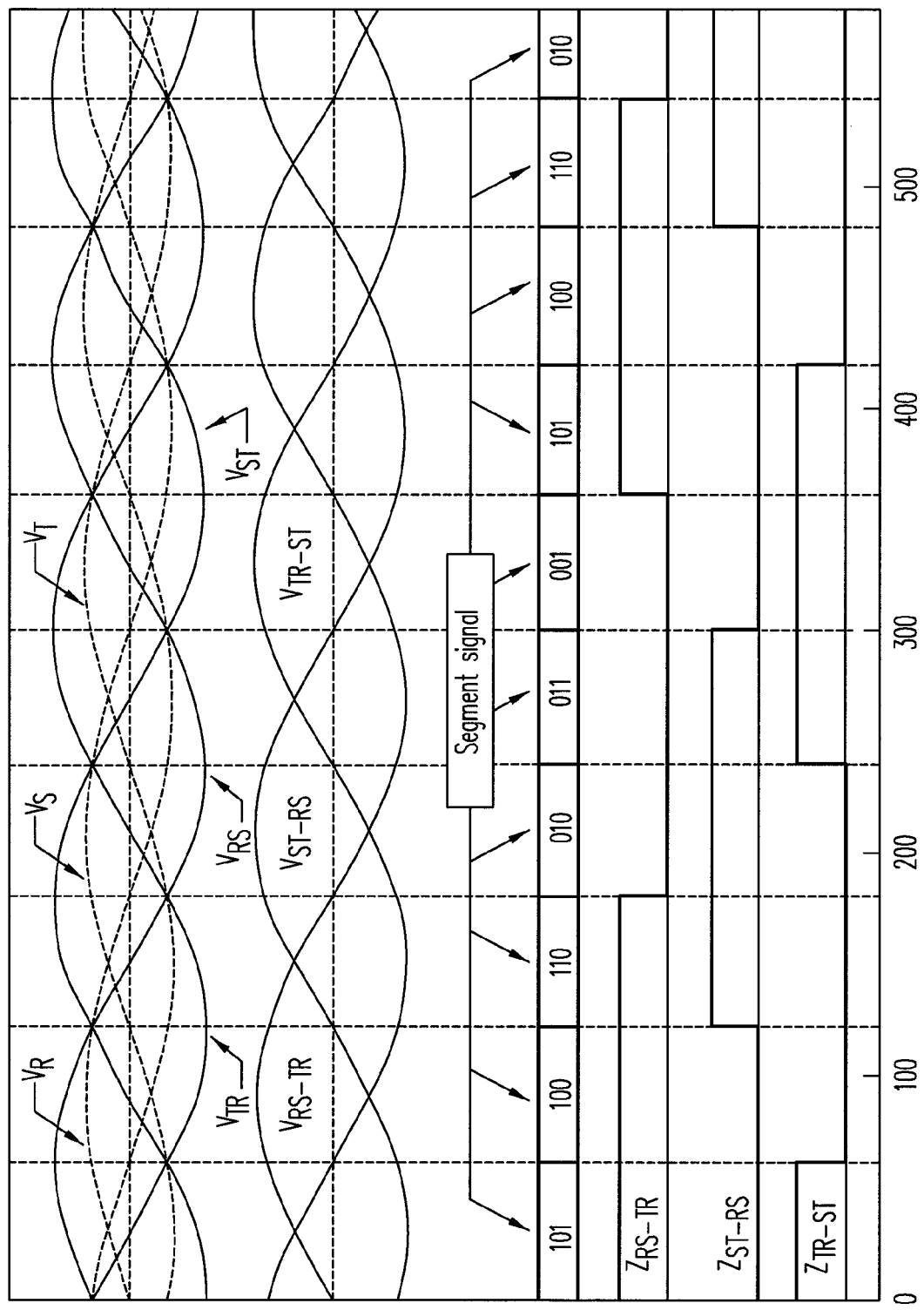
FIG. 3 shows a segment identification method in a balanced three-phase power system using zero-crossing signals $Z_{RS-TR}$, $Z_{ST-RS}$, and $Z_{TR-ST}$ generated from line-voltage difference signals $V_{RS-TR}$, $V_{ST-RS}$, and $V_{TR-ST}$, according to one embodiment of the present invention.

According to one embodiment of the present invention, segment identification may be achieved based on difference signals derived from line voltages, which may be obtained using voltage comparators. FIG. 3 shows a segment identification method in a balanced three-phase power system which uses zero-crossing signals $Z_{RS-TR}$, $Z_{ST-RS}$, and $Z_{TR-ST}$ generated from line-voltage difference signals $V_{RS-TR}$, $V_{ST-RS}$, and $V_{TR-ST}$ according to one embodiment of the present invention. In FIG. 3, phase voltages $V_R$, $V_S$, and $V_T$ are shown as dash waveforms, and line voltages $V_{RS}$, $V_{ST}$ and $V_{TR}$ are shown as solid waveforms. The line-voltage difference signals $V_{RS-TR}$, $V_{ST-RS}$ and $V_{TR-ST}$, also shown as solid waveforms, are each obtained by taking the voltage difference between a corresponding pair of line voltages. Segment transitions are provided at the zero-crossings of line-voltage difference signals $Z_{RS-TR}$, $Z_{ST-RS}$, and $Z_{TR-ST}$. Because the line voltages are balanced, each segment has a 60° duration. These segment transitions may be generated using simple combinational logics implemented either in hardware or software. From these segment transitions, segment codes can then be assigned, and proper disable or enable signals may be generated, for example, for switches 109-114 in the power converter of FIG. 1.

As shown in FIG. 3, for example, in the segment assigned code 010, zero-crossing difference signals $Z_{RS-TR}$ and $Z_{TR-ST}$ are negative (i.e., at logic low or '0'), while zero-crossing difference signal $Z_{ST-RS}$ is positive (i.e., at logic high or '1'). During this segment, of the three actual phase voltages, phase voltage $V_S$ has the largest absolute value. Preferably, phase currents $i_R$, $i_S$, and $i_T$ are in phase with their respective phase voltages $V_R$, $V_S$, and $V_T$. During this segment, phase current is flows from the source to the power stage, while phase currents $i_R$ and $i_T$ flow from the power stage back to the sources. Therefore, during this segment, phase S is "disabled," while phases R and T are "enabled."

Figure 4:
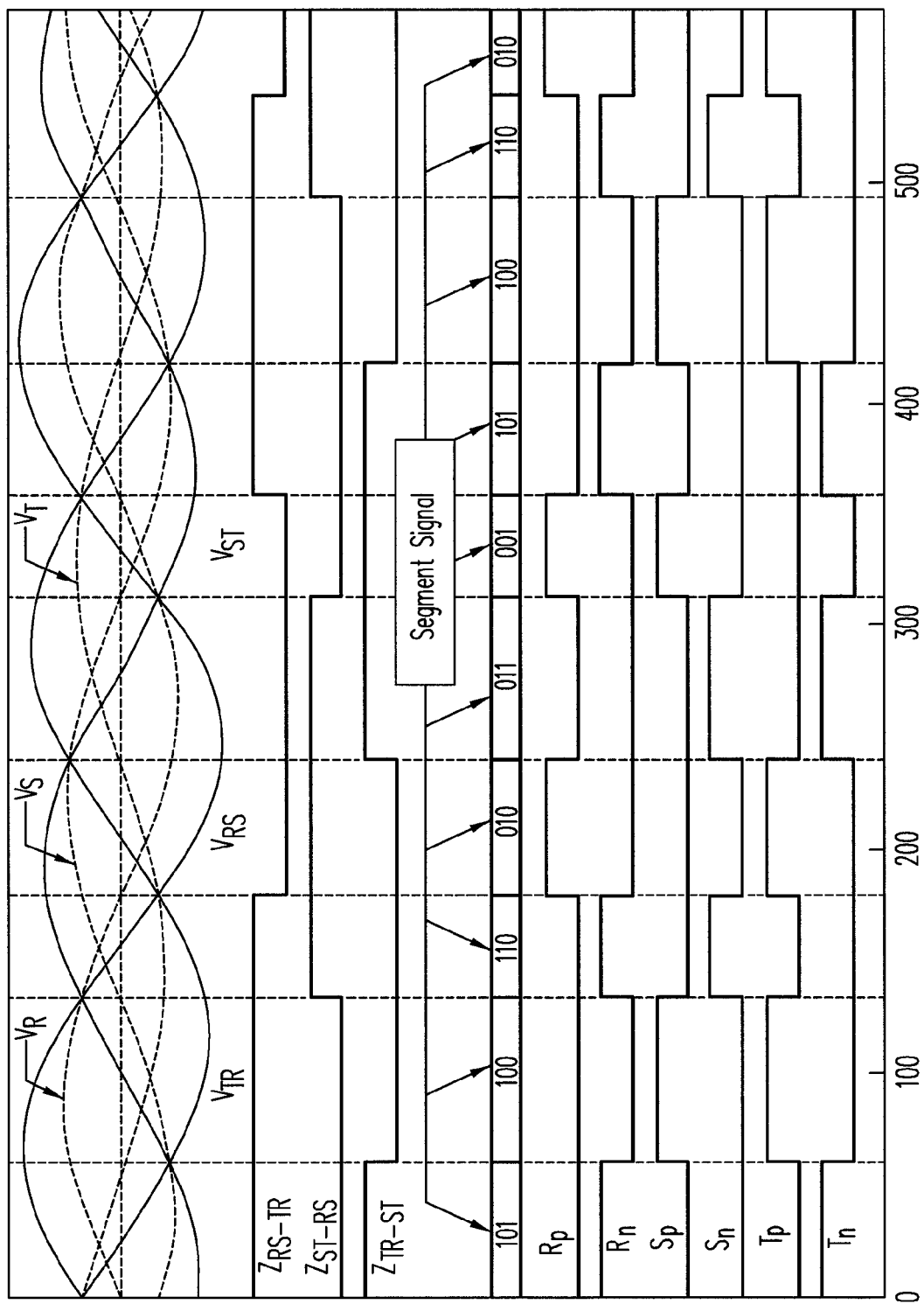
FIG. 4 shows a segment identification method applicable to an unbalanced three-phase power system without a zero-sequence voltage component, using zero-crossing signals $Z_{RS-TR}$, $Z_{ST-RS}$, and $Z_{TR-ST}$ generated from line-voltage difference signals $V_{RS-TR}$, $V_{ST-RS}$, and $V_{TR-ST}$, according to one embodiment of the present invention.

FIG. 4 illustrates a segment identification method applicable to an unbalanced three-phase power system without a zero-sequence voltage component (i.e., the sum of phase voltages is zero), using zero-crossing signals $Z_{RS-TR}$, $Z_{ST-RS}$, and $Z_{TR-ST}$ generated from line-voltage difference signals $V_{RS-TR}$, $V_{ST-RS}$, and $V_{TR-ST}$, according to one embodiment of the present invention. In FIG. 4, phase voltages $V_R$, $V_S$, and $V_T$ are shown as dash waveforms, line voltages $V_{RS}$, $V_{ST}$, $V_{TR}$ are shown as solid waveforms. Zero-crossing signals $Z_{RS-TR}$, $Z_{ST-RS}$, $Z_{TR-ST}$ may be obtained from line-voltage difference signals $V_{RS-TR}$, $V_{ST-RS}$, and $V_{TR-ST}$, in the manner discussed above. Segment transitions are generated based on the zero-crossings of the line-voltage difference signals. FIG. 4 shows the codes assigned to the states for the durations between segment transitions. FIG. 4 also shows switch enable or driving signals $R_p$, $R_n$, $S_p$, $S_n$, $T_p$ and $T_n$ for controlling switches 109, 112, 110, 113 and 111 and 114 in PRC rectifier 100 of FIG. 1.

As in the segment identification method for balanced input voltages discussed in conjunction with FIG. 3, the segment identification method of FIG. 4 is based on zero-crossings of the difference signals between line-voltages. Unlike a balanced three-phase power system, however, the unbalanced three-phase system without the zero-sequence voltage component has segment durations that do not equal 60°, generally.

In the following, boost PFC converter 100 of FIG. 1 is used to simplify analysis of segment identification methods according to the present invention. In the following, the voltage drops across boost inductors 106, 107 and 108 during a switching cycle are assumed to be zero, as the switching frequency is much higher than the line frequency. As seen in FIG. 4, during state 010, $V_{RS}-V_{TR}<0$, $V_{ST}-V_{RS}>0$, and $V_{TR}-V_{ST}<0$, as indicated by zero-crossing signals $Z_{RS-TR}$, $Z_{ST-RS}$, and $Z_{TR-ST}$, which have respectively logic values '0', '1', and '0'. These inequalities may be rewritten as:

$$V_R-V_S<V_T-V_R \quad (1)$$

$$V_S-V_T>V_R-V_S \quad (2)$$

$$V_T-V_R<V_S-V_T \quad (3)$$

From (1) and (2), it follows that:

$$2V_R<V_S+V_T \quad (4)$$

$$2V_S>V_R+V_T. \quad (5)$$

substituting (4) into (5) obtains:

$$2V_R < V_S + V_T < 3V_S - V_R,$$

or, $$V_R < V_S \quad (6)$$

Similarly, from (3) and (6):

$$2V_T < V_R + V_S < 2V_S,$$

which provides:

$$V_T < V_S.$$

For three-phase balanced input voltages or unbalanced input voltages with no zero-sequence voltage component, the three-phase input voltages sum to zero, i.e., $$V_R + V_S + V_T = 0 \quad (7)$$

Combining (1), (2), (3) and (7) obtains $V_R<0$, $V_S>0$, and $V_T<0$. Since both $V_R$ and $V_T$ have the same sign, which is opposite to $V_S$, it follows that:

$$|V_S| = |V_R + V_T| > |V_R|, \quad (8)$$

$$|V_S| = |V_R + V_T| > |V_T|. \quad (9)$$

In other words, within this segment, (8) and (9) provide that phase voltage $V_S$ has the largest absolute value and thus provides the largest current. In fact, because phase voltage $V_S$ is disabled, the associated phase current is the sum of the currents associated with the enabled phase voltages $V_R$ and $V_S$. Thus, this segment represents the time period during which phase voltage $V_S$ has the largest absolute value and a sign opposite those of the other two phase voltages $V_R$ and $V_T$. Similar analysis shows that all other segments may be similarly identified.

In the methods of the present invention, segment duration is determined by zero-crossings of the line-voltage difference signals. For example, in the segment assigned state code 010, segment transitions take place when phase voltage $V_R$ crosses zero, and when phase voltage $V_T$ crosses zero. Relationship (7) also provides that, during the 010 state, line-voltage difference signal $V_{RS-TR}$ crosses zero when phase voltage $V_R$ crosses zero, and line-voltage difference signal $V_{TR-ST}$ crosses zero when phase voltage $V_T$ crosses zero. FIG. 4 shows the driving signals for switches 109-114 of FIG. 1 in a system having unbalanced input voltages with no zero-sequence component.

Figure 5:
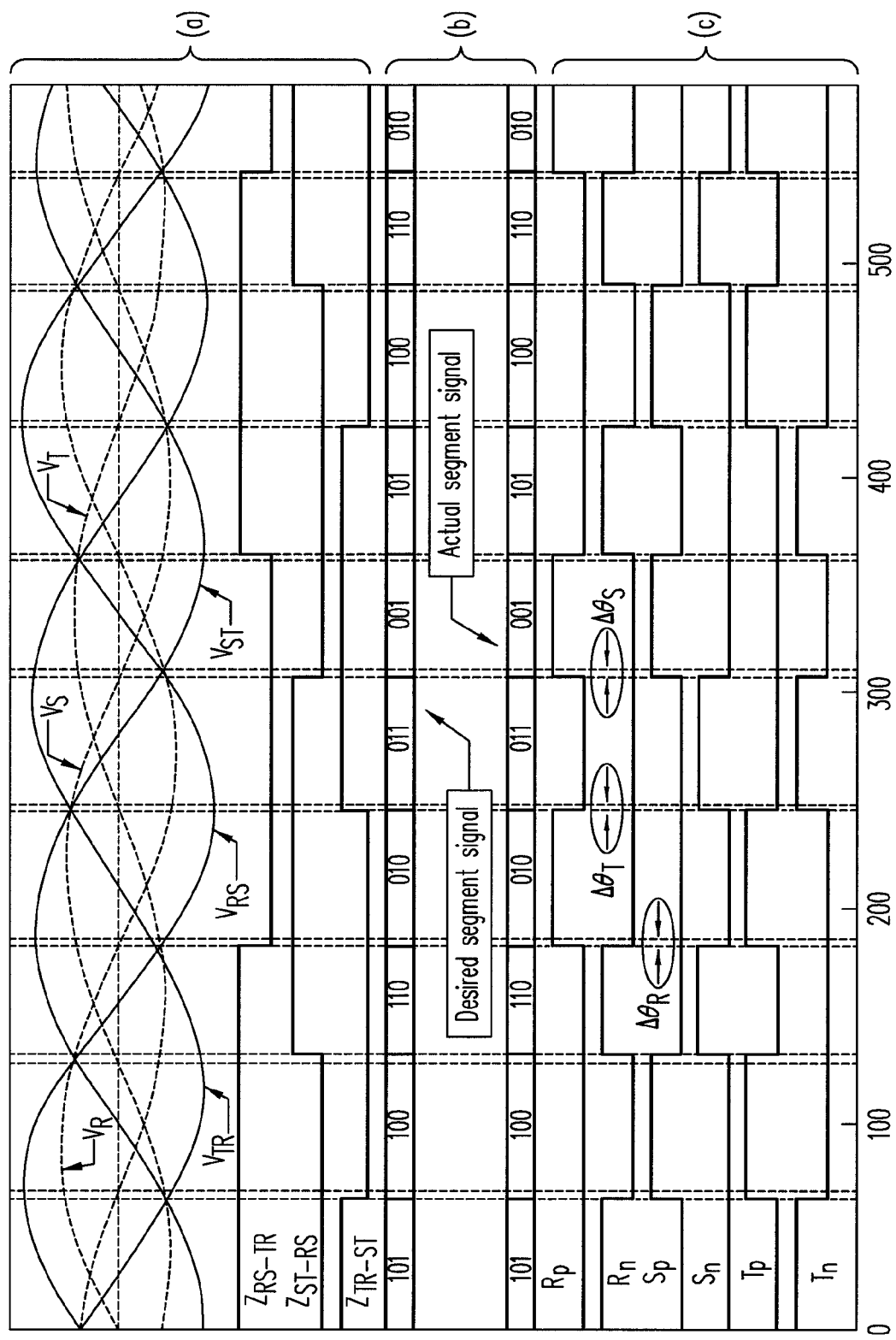
FIG. 5 shows that, in a system with unbalance input voltages and a zero-sequence component, a phase difference exists between the actually identified segment using the method of FIG. 3 and the desired segment identification; specifically.

According to one embodiment of the present invention, segment signal generation may be applicable to a system receiving three-phase unbalance input voltages, with a positive-sequence component, a negative-sequence component, and a zero-sequence component. Because of the zero-sequence component, the three phase voltages in that embodiment do not necessarily sum to zero. As a result, segment identification based on the zero-crossings of the line-voltage difference signals is not perfectly accurate, as illustrated by FIG. 5. FIG. 5 shows (a) phase voltages $V_R$, $V_S$, and $V_T$, line voltages $V_{RS}$, $V_{ST}$, and $V_{TR}$, and zero-crossing signals $Z_{RS-TR}$, $Z_{ST-RS}$, and $Z_{TR-ST}$; (b) the desired and actual segment transitions, and the corresponding code assignments for the desired and actual segments; and (c) the driving signals generated for switches 109 to 114 of PFC rectifier 100 of FIG. 1, for the unbalanced input voltages with a zero-sequence voltage component.

FIG. 5 shows, in a system with unbalance input voltages and a zero-sequence component, a phase difference exists between the actually identified segment using the method of FIG. 4 and the desired segment identification. When the zero-sequence component is relatively small, the phase difference is not significant and the accuracy of the segment identification method of FIG. 4 is quite acceptable in most practical applications. Generally, the phase angle difference varies with each segment and, for each phase voltage, equals to the phase angle difference between the phase voltage (e.g. $V_S$) and its corresponding line-voltage difference (e.g. $V_{ST-RS}$). The phase angle differences $\Delta\theta_S$, $\Delta\theta_R$, and $\Delta\theta_T$ shown in FIG. 5 are provided as follows:

$$\Delta\theta_S = \theta_S - \theta_{ST-RS} = \theta_S - \tan^{-1}\frac{2A_S\sin\theta_S - A_R\sin\theta_R - A_T\sin\theta_T}{2A_S\cos\theta_S - A_R\cos\theta_R - A_T\cos\theta_T},$$

$$\Delta\theta_R = \theta_R - \theta_{RS-TR} = \theta_R - \tan^{-1}\frac{2A_R\sin\theta_R - A_S\sin\theta_S - A_T\sin\theta_T}{2A_R\cos\theta_R - A_S\cos\theta_S - A_T\cos\theta_T},$$

$$\Delta\theta_T = \theta_T - \theta_{TR-ST} = \theta_T - \tan^{-1}\frac{2A_T\sin\theta_T - A_R\sin\theta_R - A_S\sin\theta_S}{2A_T\cos\theta_T - A_R\cos\theta_R - A_S\cos\theta_S},$$

where, the actual three-phase unbalanced input voltages are respectively represented as, $$v_R = A_R \sin(\omega t + \theta_R),$$

$$v_S = A_S \sin(\omega t + \theta_S),$$

$$v_T = A_T \sin(\omega t + \theta_T),$$

and where $A_R$, $A_S$, and $A_T$ are the respective amplitudes and $\theta_R$, $\theta_S$, and $\theta_T$ the respective phase angles of the three-phase voltages, and $\omega$ is the line angular frequency.

Figure 6:
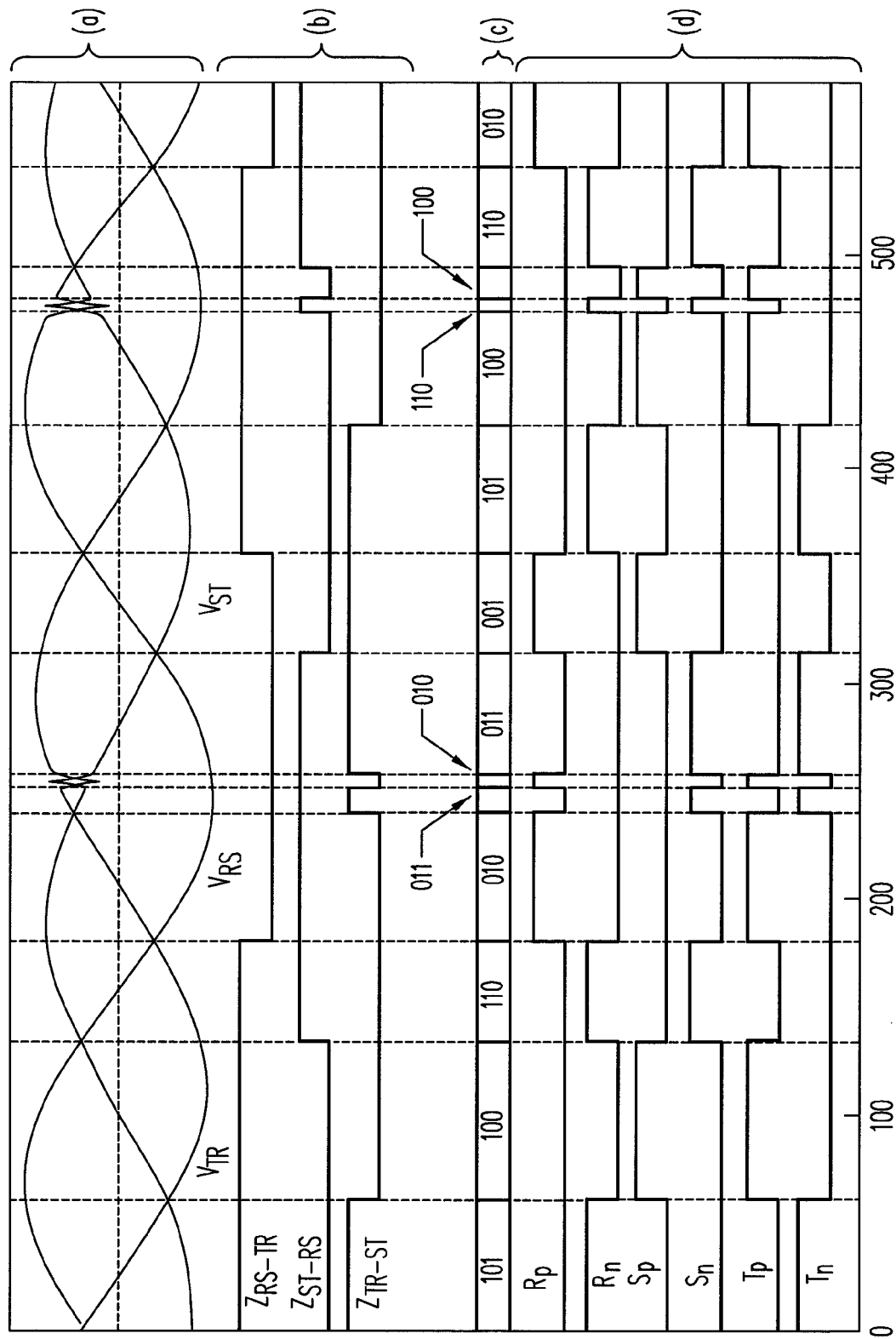
FIG. 6 shows (a) waveforms of disturbed line voltages $V_{ST}$, $V_{TR}$, and $V_{RS}$; (b) zero-crossing signals $Z_{RS-TR}$, $Z_{ST-RS}$, and $Z_{TR-ST}$ derived from line-voltage difference signals $V_{RS-TR}$, $V_{ST-RS}$, and $V_{TR-ST}$; (c) segments identified and their corresponding codes; and (d) enable or driving signals for each of switches 109-114 of the PFC rectifier 100 of FIG. 1, as decoded using a conventional basic decoder.

Once segments are properly identified, the correct switch state for each segment is determined (i.e., determining which pair of switches needs to be modulated in each segment) in a switch-state decoder. In a typical, basic switch-state decoder, the decoder output is a function only of the values of its present input signals derived from the input voltages (i.e., the basic decoder operates in a open-loop fashion). As a result, this basic switch-state decoder may generate a false switching state, when input voltage disturbance is present. FIG. 6 provides an example. FIG. 6 shows (a) waveforms of disturbed line voltages $V_{ST}$, $V_{TR}$, and $V_{RS}$; (b) zero-crossing signals $Z_{RS-TR}$, $Z_{ST-RS}$, and $Z_{TR-ST}$ derived from line-voltage difference signals $V_{RS-TR}$, $V_{ST-RS}$, and $V_{TR-ST}$; (c) segments identified and their corresponding codes; and (d) enable or driving signals for each of switches 109-114 of the PFC rectifier 100 of FIG. 1, as decoded using a conventional basic decoder.

As shown in FIG. 6, during the time interval between time $t_1$ and time $t_2$, zero-crossing signal $Z_{TR-ST}$ (derived from line-voltage difference signal $V_{TR-ST}$) changes its state from logic high level '1' to logic low level '0' momentarily, due to a disturbance in line voltages $V_{TR}$ and $V_{ST}$. As a result of this disturbance, the output state 011 of a conventional basic decoder would change to 010 momentarily. This state change causes, instead of modulating switches 113 and 114 (also labeled $S_n$ and $T_n$) in the lower side of PFC rectifier 100 of FIG. 1, modulating switches 109 and 111 (also labeled $R_p$ and $T_p$) in the high side of PFC rectifier 100 during the disturbance. This erroneous disturbance-induced modulation undesirably introduces additional switching losses and increases phase-current distortions.

Figure 7:
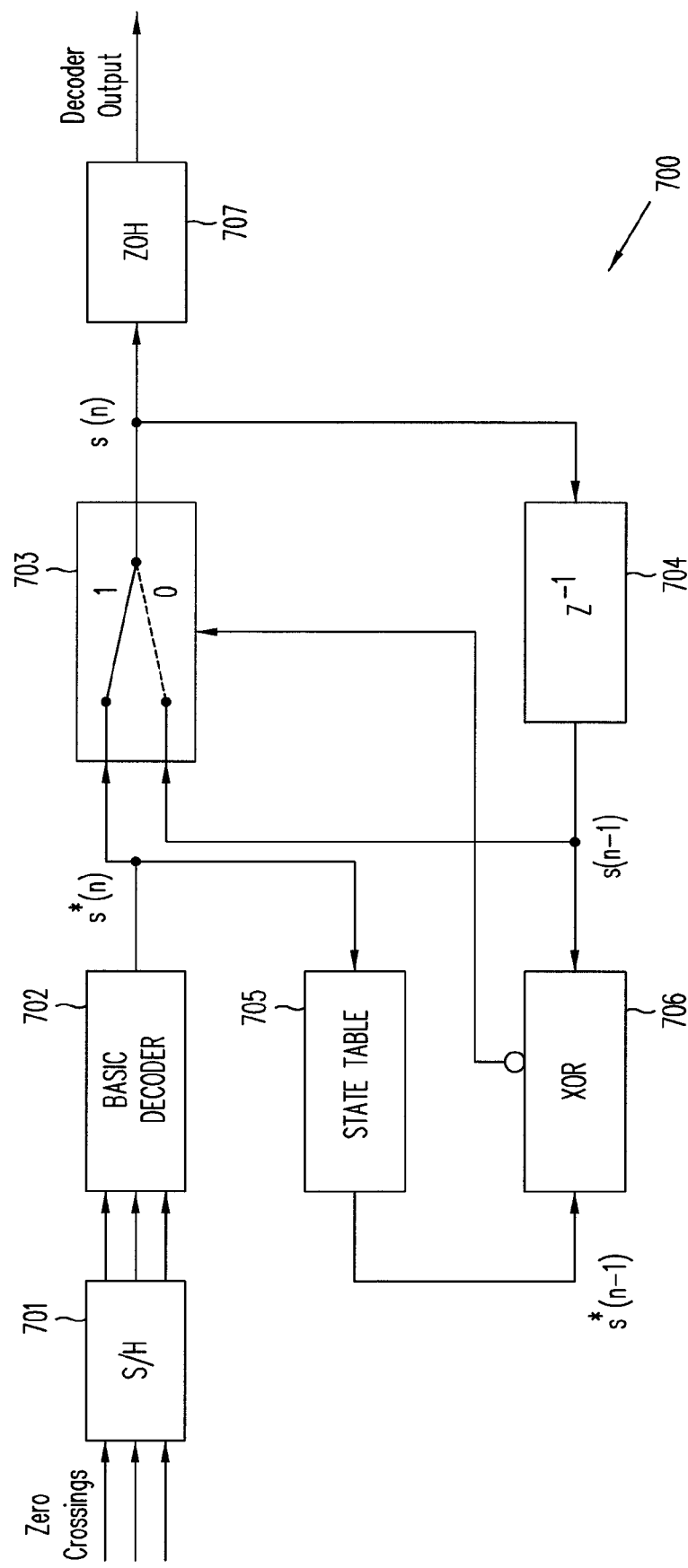
FIG. 7 is a block diagram of robust decoder 700, according to one embodiment of the present invention.
Figure 8B:
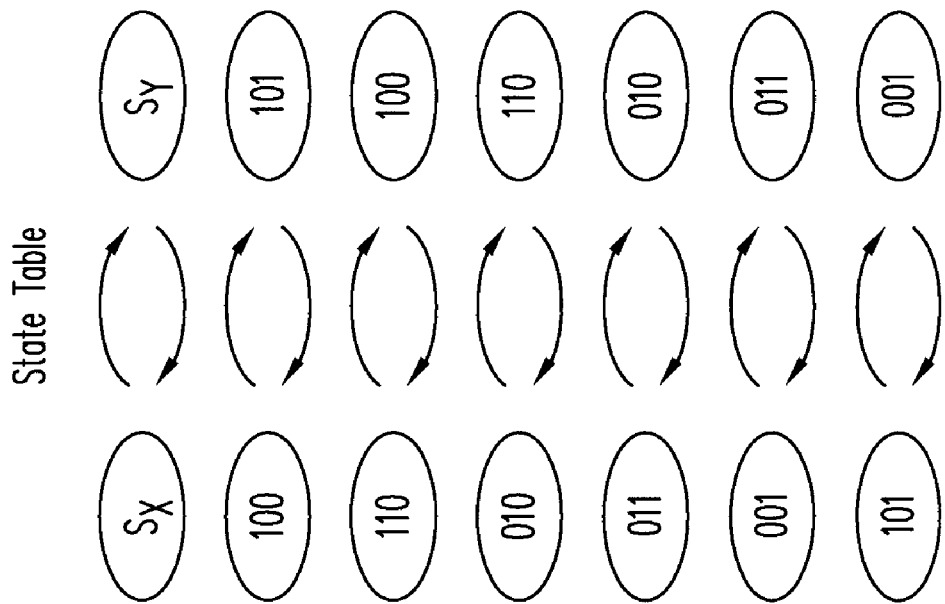
FIG. 8B is a switch state table of a robust decoder, in accordance with one embodiment of the present invention.
Figure 8A:
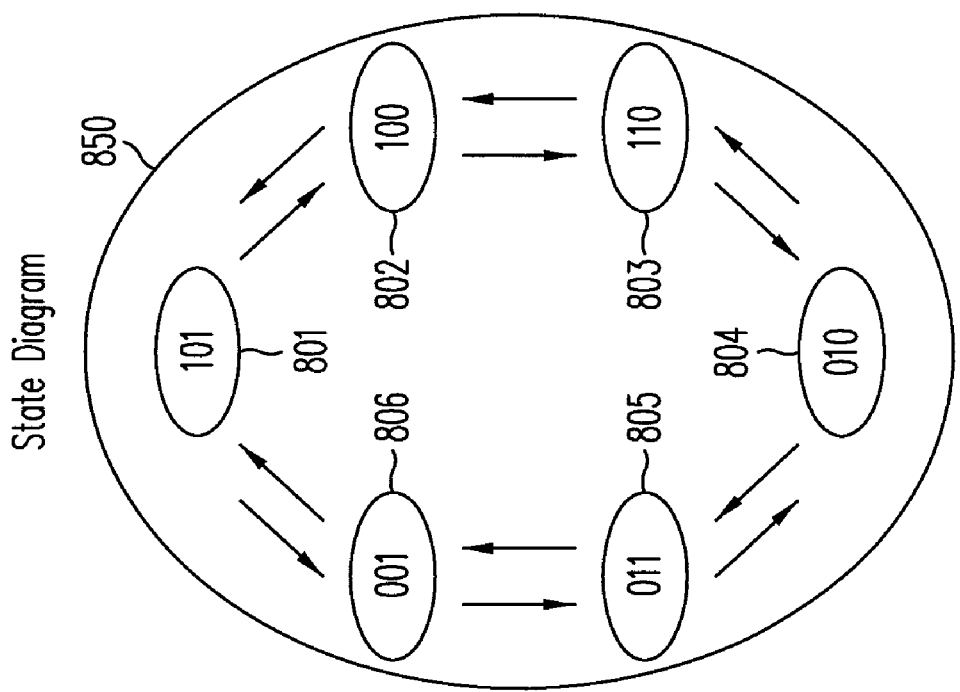
FIG. 8A is a switch state diagram for a basic decoder.

FIG. 7 is a block diagram which shows robust decoder 700, according to one embodiment of the present invention. Robust decoder 700 includes sample and hold circuit 701, open-loop basic decoder 702 and binary feedback loop 710, which uses switch state look-up table 705 to determine whether or not its binary inputs are experiencing a disturbance. Switch state table 705 is based on state diagram 800 of FIG. 8A, which includes switch states 801-806, each of which corresponds to one of the six segments in a line cycle. State diagram 800 assumes that the input voltages are disturbance-free. As shown in FIG. 8A, each switch state is assigned a three-digit binary number, with each bit encoding the state of one of binary zero-crossing signals $Z_{RS-TR}$, $Z_{ST-RS}$, and $Z_{TR-ST}$, associated with line-voltage difference signals $V_{RS-TR}$, $V_{ST-RS}$, and $V_{TR-ST}$, respectively. Specifically, the states of zero-crossing signals $Z_{RS-TR}$, $Z_{ST-RS}$, and $Z_{TR-ST}$ represent the instantaneous states of line-voltage difference signals $V_{RS-TR}$, $V_{ST-RS}$, and $V_{TR-ST}$, respectively. For example, switch state 110 corresponds to $V_{RS-TR}>0$, $V_{ST-RS}>0$, and $V_{TR-RS}<0$, and represents the line-voltage relationship $V_{ST}>V_{RS}>V_{TR}$. (Logic low level '0' indicates a negative voltage value in a line-voltage difference signal; likewise, logic high level '1' indicates a positive value in a line-voltage difference signal).

Generally, three-phase line voltages can have a quasi-positive sequence or a quasi-negative sequence. The quasi-positive sequence corresponds to the phase sequence in which line voltage $V_{RS}$ leads line voltage $V_{ST}$, which in turns leads line voltage $V_{TR}$. The quasi-negative sequence corresponds to the phase sequence that is the reverse of the quasi-positive sequence. In state diagram 800 of FIG. 8A, the quasi-positive sequence is represented by line-voltage transitions in the clockwise direction, and the quasi-negative sequence is represented by line-voltage transitions in the counter-clockwise direction. State diagram 800 allows state table 850 of FIG. 8B to be developed. FIG. 8B defines the driving signals that controls the switch states (e.g., the states of switches 109 to 114 of PFC rectifier 100 of FIG. 1) to be derived.

In FIG. 8B, the quasi-positive input line-voltage sequence is shown in column $S_X$, and the quasi-negative line-voltage sequence is shown in column $S_Y$. In state table 850, the state code determines which switches in the PFC rectifier 100 of FIG. 1 are enabled. For example, switch state code 001 indicates that both upper-side switches 109 ($R_P$) and 110 ($S_P$) are enabled for modulation. In addition, based on this present switch state code, the line-voltage sequence, and switch state table 850, the last noise-free switch state code can be obtained from state table 850. More specifically, for the quasi-positive sequence, the last switch state code for each state is the corresponding state code to the right in column $S_Y$ at the same level. Similarly, for a quasi-negative sequence, the last switch state code for each state code is the corresponding state code to the left in column $S_X$ at the same level. For example, if the present state code is 110 and the input voltages follow the quasi-positive sequence, the last switch state code according to state table 850 is 100.

Unlike the basic decoder, the output state of robust decoder 700 of FIG. 7, according to the present invention, is determined by both the values of its present inputs and its last switch state code. Referring to FIG. 7, at time t(n), which is also referred to as sampling interval 'n' (or simply 'n'), three zero-crossing signals are simultaneously sampled at sample and hold circuit 701 and provided to basic decoder 702, which provides a switch state output based on its present input values. Because the input zero-crossing signals are subject to input-line voltage disturbance, the output state of basic decoder 701, denoted s*(n), is not necessarily the correct decoded output state s(n) for time t(n).

To ensure that the correct state code is output, robust decoder 700 determines whether or not the present zero-crossing input values are disturbed. To make such a determination, state s*(n) of basic decoder 702 is fed into switch-state look-up table 705 to look up the presumed output state s*(n−1) of the last sampling interval. Using an exclusive NOR operation 706, this looked-up presumed output state s*(n−1) is then compared to the actual previous switch state s(n−1) saved in state element 704 (e.g., a register) in robust decoder 700. The result from the exclusive NOR operation 706 is used in two-to-one multiplexer 703 to select between state code s*(n) of basic decoder 702 and actual previous switch state s(n−1) to provide present switch state s(n) as its output. If the exclusive NOR logic operation provides a logic high level output (i.e., logic '1'), the looked-up presumed output state s*(n−1) at the time t(n−1) matches the actual previous switch state s(n−1), the present binary input signals are considered noise (disturbance) free. Consequently, output switch state s*(n) from basic decoder 702 becomes present state s(n) (i.e., the output of the robust decoder 700). If the exclusive NOR logic operation provides a logic low level output (i.e., logic '0'), the presumed output state s*(n−1) does not match the actual previous state s(n−1), the present zero-crossing inputs are regarded as disturbed. In this case, the present switch state s(n) is kept unchanged from the actual previous state s(n−1). Therefore, by saving the present output switch state code for one sampling interval, the present invention significantly improves robustness in decoder operation with respect to line voltage disturbances.

Figure 9:
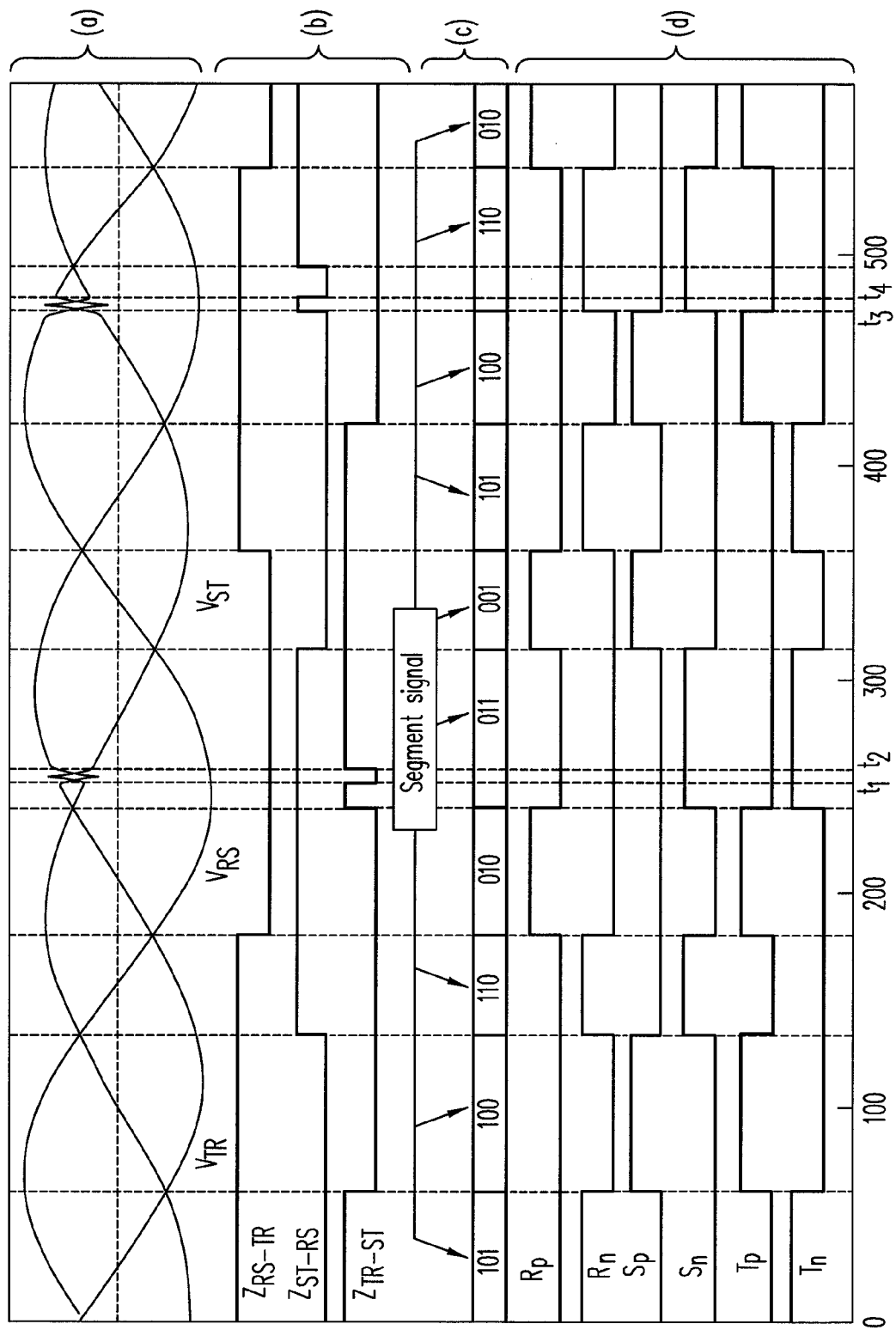
FIG. 9 shows (a) waveforms of disturbed line voltages $V_{ST}$, $V_{TR}$, and $V_{RS}$; (b) zero-crossing signals $Z_{RS-TR}$, $Z_{ST-RS}$, and $Z_{TR-ST}$ derived from line-voltage difference signals $V_{RS-TR}$, $V_{ST-RS}$, and $V_{TR-ST}$; (c) segments identified and their corresponding codes; and (d) enable or driving signals for each of switches 109-114 of the PFC rectifier 100 of FIG. 1, as decoded using a robust decoder (e.g., robust decoder 700 of FIG. 7), according to one embodiment of the present invention.

The operation of a robust decoder of the present invention is further explained by the examples illustrated in FIGS. 6 and 9. In the example in FIG. 6, at time to, a segment transition takes place in the converter in the absence of line voltage disturbance. Immediately before the segment transition of time to, a robust decoder of the present invention (e.g., decoder 700 of FIG. 7) generates switch state s(n−1) with switch state code 100. Immediately after that segment transition, the output of a basic decoder s*(n) would change its state to 110. Using the state look-up table, the presumed noise-free switch state s*(n−1) would be 100. Because the looked-up presumed switch state s*(n−1) and the actual previous switch state s(n−1) are both 100, the transition is considered disturbance free and the present state output s(n) of the robust decoder would change its switch state code from 100 to 110.

In the presence of input voltage disturbances (e.g., disturbances of line voltages $V_{TR}$ and $V_{ST}$ during time interval between time $t_1$ and time $t_2$ in FIG. 6), the zero-crossing signal from line voltage difference signal $V_{TR}-V_{ST}$ changes its state from logic high level '1' to logic low level '0'. As a result, the present output state s*(n) provided from a basic decoder would be 010, which is not the correct switch state code. However, as shown in FIG. 9, with a robust decoder of the present invention (e.g., robust decoder 700 of FIG. 7), the undesirable decoder output change is prevented. In a robust decoder, the presumed switch state s*(n−1) of the last sampling interval has switch code 110, which corresponds to the erroneous present state s*(n) with switch code 010. Since switch code 110 does not match switch code 011 of actual previous switch state s(n−1), the robust decoder detects that the present input zero-crossing signals are disturbed. The present output state s(n) in a robust decoder therefore remains unchanged (i.e., it stays with state code 011). Accordingly, the driving signals for switches 109 to 114 remains unchanged, as actual previous switch state s(n−1) shown in FIG. 9.

Thus, robust decoder 700 of FIG. 7, according to the present invention, rejects line voltage disturbance, except when a disturbance changes the output state of the basic decoder to the switch state that normally follows the present segment in disturbance-free operation. For example, as shown in FIG. 6, during time period between time $t_3$ and time $t_4$, line voltages $V_{ST}$ and $V_{RS}$ are disturbed, changing the switch state code of switch state s*(n) of the basic decoder to 110. Since the decoder output state s(n−1) immediately before the voltage disturbance is 100, which coincides with switch state code 100 that would be the switch code for the next segment under normal operation. As the state code of the actual previous switch state s(n−1) coincides with the state code of presumed switch state s*(n−1) obtained from the state look-up table, an erroneous disturbance-induced transition is mistaken to be a normal segment transition. As a result, robust decoder 700 of FIG. 7 would allow a premature change in output state, as illustrated in FIG. 9. This untimely segment change may lead to current glitches.

Figure 10:
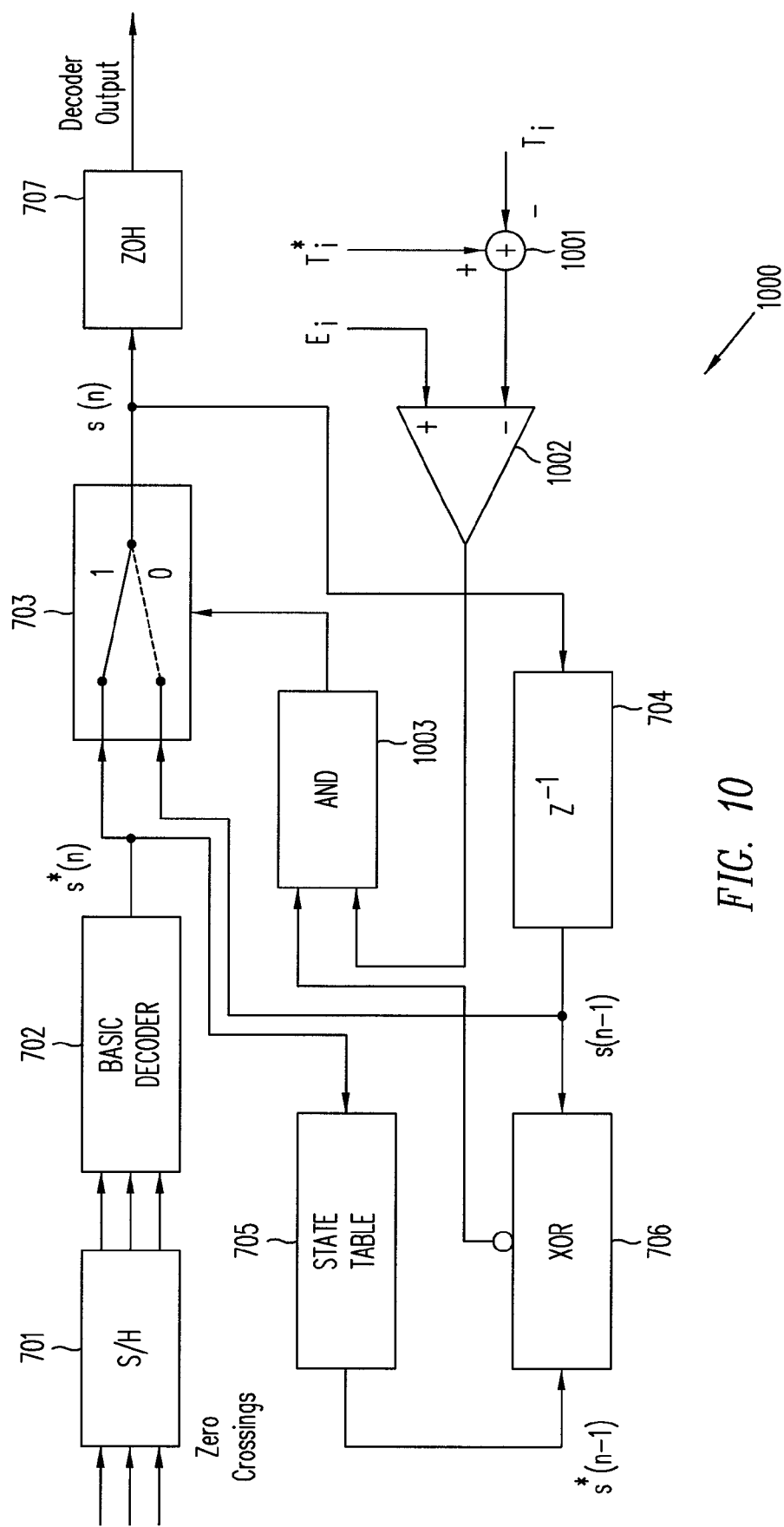
FIG. 10 is a block diagram of robust decoder 1000 of FIG. 10, which overcomes the deficiencies of robust decoder 700 FIG. 7, according one embodiment of the present invention.

FIG. 10 is a block diagram of robust decoder 1000 of FIG. 10, which overcomes the deficiencies of robust decoder 700 FIG. 7, according one embodiment of the present invention. As shown in FIG. 10, robust decoder 1000 includes robust decoder 700 of FIG. 7 and additional segment measurement block 1001 and comparison blocks 1002 and 1003. Robust decoder 1000 measures the duration of each segment in steady state and rejects any segment changes that would shorten the segment duration time. Individual segment durations may be measured over several line cycles to obtain an average value for the individual segment durations. The average value provides greater measurement accuracy relative to a single measurement. In FIG. 10, a measurement of the $i^{th}$ segment duration and its average value are denoted by $T_i$ and $T_i^*$ (i=1, 2, . . . 6), respectively. Each segment duration is measured on-line by a timer that is initiated at the start of the segment and terminated at the next segment transition, which can be either a normal (i.e., disturbance-free) or a disturbance-related transition. As shown in FIG. 10, a real-time measured segment duration of $T_i$ is compared to a corresponding segment multi-cycle average duration $T_i^*$ to obtain a segment-duration difference $(T_i^*-T_i)$. If the segment-duration difference is less than a predetermined tolerance $E_i$ (i.e., $(T_i^*-T_i)<E_i$), the output of comparator 1002 provides a high logic level output (i.e., logic level '1'), so that robust decoder 1000 operates substantially in the same way as robust decoder 700 of FIG. 7. However, if the segment-duration difference is greater than predetermined tolerance $E_i$ (i.e., $(T_i^*-T_i)>E_i$), comparator 1002 provides a logic low level output (i.e., logic level '0'), which disables segment transition through AND gate 1003. In practice, the segment-duration tolerance $E_i$ is designed to equal a sufficiently large percentage of the average duration $T_i^*$.

Figure 11:
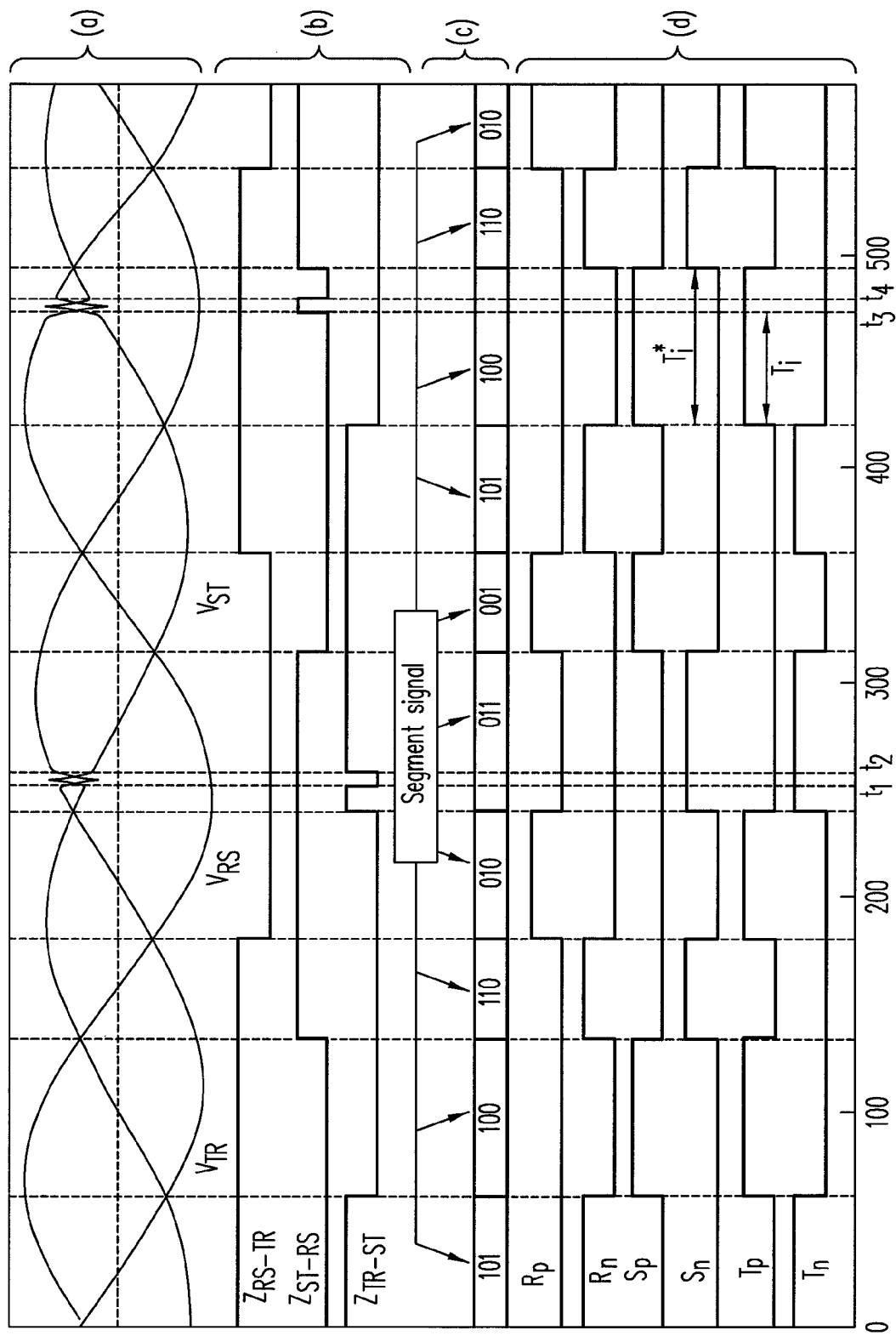
FIG. 11 shows (a) waveforms of disturbed line voltages $V_{ST}$, $V_{TR}$, and $V_{RS}$; (b) zero-crossing signals $Z_{RS-TR}$, $Z_{ST-RS}$, and $Z_{TR-ST}$ derived from line-voltage difference signals $V_{RS-TR}$, $V_{ST-RS}$, and $V_{TR-ST}$; (c) segments identified and their corresponding codes; and (d) enable or driving signals for each of switches 109-114 of the PFC rectifier 100 of FIG. 1, as decoded using a robust decoder (e.g., robust decoder 1000 of FIG. 10), according to one embodiment of the present invention.

FIG. 11 shows that a switch state change resulting from the disturbances on line voltages $V_{ST}$ and $V_{RS}$ during time interval between time $t_3$ and time $t_4$ is ignored in a robust decoder (e.g., robust decoder 1000 of FIG. 10), when a segment duration difference is less than a predetermined tolerance (i.e., $(T_i^*-T_i)<E_i$). Robust decoder 1000 provides more reliable segment decoding, which reduces switching losses resulting from undesired switch state changes and achieves faster response during transients and line frequency variations.

Since the present output of a robust decoder (e.g., robust decoder 1000 of FIG. 10) depends on both the present and past output states, properly generated reference zero-crossing signals are required. To avoid a robust decoder of the present invention from decoding error during transients, the initial reference signal is preferably reset in every line cycle. For unbalanced input voltages, robust decoders 700 and 1000 described above may require that adjacent input line voltages to be no greater than certain predetermined amplitude and phase-angle difference, as their state tables may include undesired zero switch states, such as 111 or 000.

Generally, during segment transitions in which one phase voltage abruptly changes its state from "disabled" to "enabled," while another phase voltage makes its state change from "enabled" to "disabled," current glitches result because the duty cycle of the phase voltage switching from a "disabled" state to an "enabled" state does not match the duty cycle required to carry the phase current. In fact, while the phase voltage is disabled, its duty cycle is not regulated and it typically deviates from the value that is required when that phase voltage is enabled and its current is being regulated. Due to the limited bandwidth in a current loop, a delay exists before the duty cycle reaches its steady state value. During this time, a duty cycle transient may lead to a current transient, which is seen as a current glitch.

For a boost PFC rectifier operating in steady state with balanced input voltages, the current associated with a phase voltage that changes its state from "enabled" to "disabled" is mirror symmetric to the current of the same phase voltage when the phase voltage reverts from the "disabled" state back to the "enabled" state. Since the current in that enabled state is controlled by the duty cycle associated with that phase voltage, the duty cycle transients and associated current glitches can be reduced and even eliminated if the duty cycle value that occurs when a phase voltage is disabled is re-applied when the same phase voltage is enabled then next time. This control scheme may be achieved by freezing the duty cycle and the related control variables when a phase voltage changes its state from "enabled" to "disabled." For unbalanced input voltages, this control scheme may be effectively if the input voltages are slightly unbalanced, so that the values of the phase current and the corresponding duty cycle at the time a phase voltage is disabled are relatively close to the phase-current and duty-cycle values when the same phase voltage is enabled again.

Figure 12:
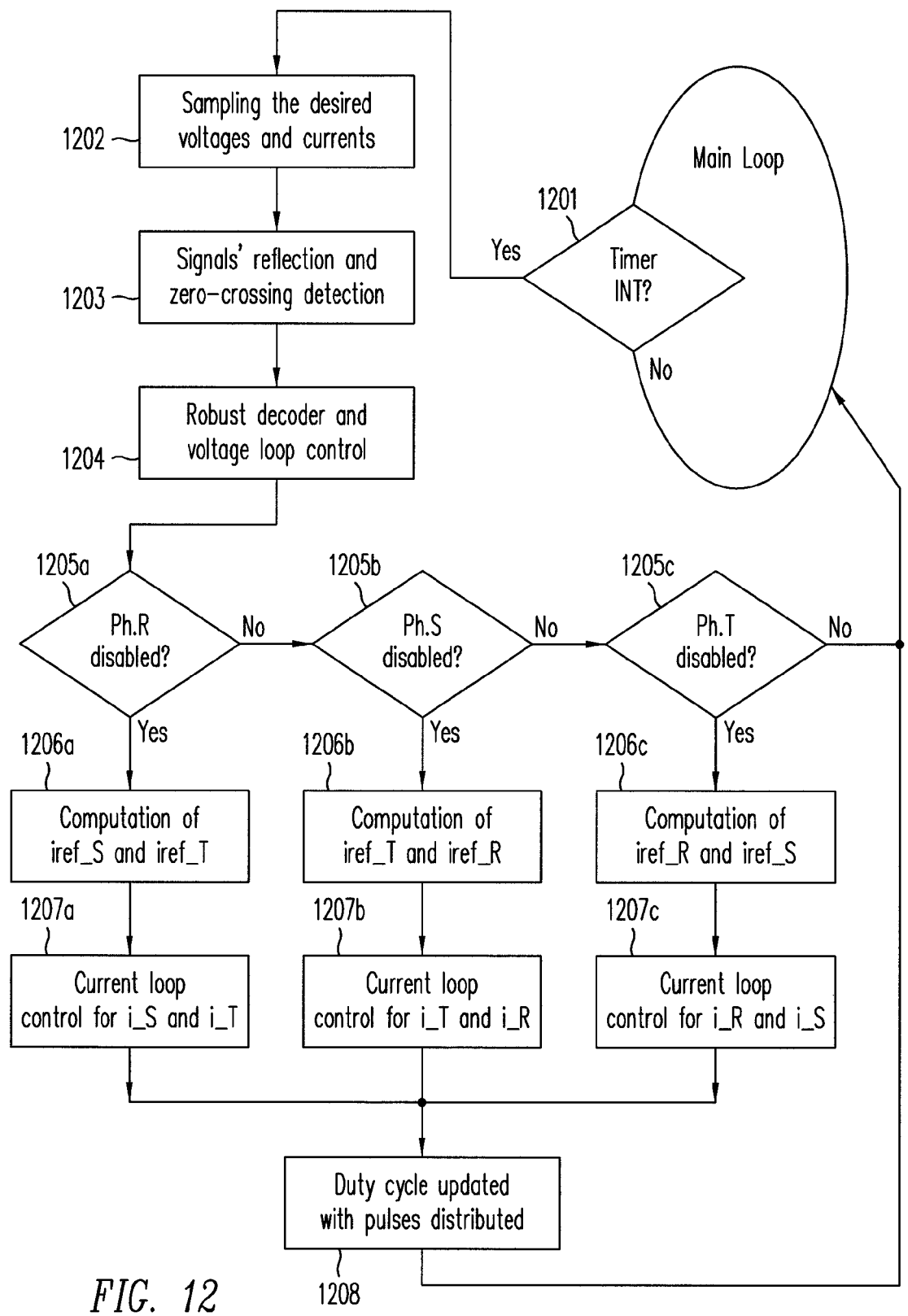
FIG. 12 is a flow chart showing software operations in a digital signal processor (DSP) for controlling a six-step, three-phase boost PFC converter with current glitch minimization during segment transitions, according to one embodiment of the present invention.

Finally, using a DSP to reduce current-glitching in PRC rectifier (e.g., PFC 100 of FIG. 1) allows a simple design without dedicated hardware circuits. FIG. 12 is a flowchart showing software operations in a digital signal processor (DSP) for controlling a six-step, three-phase boost PFC converter with current glitch minimization during segment transitions, according to one embodiment of the present invention. In one digital control implementation, a timer is used as sampling interval generator to produce regular interrupt sampling signals. As shown in FIG. 12, each periodic sampling interrupt request causes the DSP to exit main loop 1201 into an interrupt service subroutine (step 1202). The DSP samples input voltages, currents, and output voltage (steps 1202), and processes rectification by taking absolute value after subtracting a predetermined voltage offset and detecting zero-crossings (step 1203). A robust decoder (e.g., any of robust decoders of FIGS. 7 and 10) and a voltage-loop control algorithm are provided for segment identification and voltage loop control (step 1204).

Upon identifying the segment, the DSP disables the dominant phase voltage (any of steps 1205a, 1205b and 1205c). After calculating the enabled phase-current references by multiplying the output voltage of the voltage controller with the individual phase-voltage signals estimated or with the internally generated sinusoidal signals (any of steps 1206a, 1206b and 1206c), the DSP provides current-loop control for the enabled phase voltages, without changing the current-loop control variables and the disabled phase voltage. For example, when phase voltage S becomes a dominant phase and disabled, both phase voltage R and phase voltage T are enabled (steps 1205b, 1206b). Current references and current-loop control algorithms are performed for phase voltages R and T, keeping the current-loop control variables associated with phase voltage S unchanged (step 1207b). The desired duty cycle is updated with the relevant PWM pulses distributed to the individual gate driving circuits to modulate switches 109 to 114. The DSP then waits in the main loop for the next sampling interval signal (step 1201).

This detailed description provides examples of how the present invention may best be carried out. Those with knowledge in the art will recognize that various details may be modified or varied within the scope of the present invention. The present invention is set forth in the following claims.

We claim:

1. A robust decoder for generating an output state receiving input signals, comprising:
    a basic decoder that provides a current output state based on the input signals, each input signal being derived from a voltage difference between a pair of line voltages in a multi-phase power system;
    a state table for providing a presumed previous state based on the current output state of the basic decoder;
    a binary feed back loop including a state element for storing a previous output state; and
    a selector for providing the output state based on the stored previous output state and the presumed previous state.

2. A robust decoder as in claim 1, comprising combinational logic implemented in hardware.

3. A robust decoder as in claim 1, further comprising a segment duration measurement circuit which measures a duration between successive output states and wherein the selector takes into consideration the duration measured in providing the output state.

4. A robust decoder as in claim 3, wherein the segment measurement circuit further provides an average duration between successive output states over a plurality of line cycles.

5. A robust decoder as in claim 4, wherein the selector maintains the current output state when a difference between the measured segment duration and the average duration is within a predetermined tolerance.

* * * * *